US012303894B2

(12) United States Patent
Kobayashi et al.

(10) Patent No.: US 12,303,894 B2
(45) Date of Patent: *May 20, 2025

(54) FLUIDIC DEVICE AND SYSTEM (71) Applicant: NIKON CORPORATION, Tokyo (JP)

(72) Inventors: Ryo Kobayashi, Kawasaki (JP);
Tetsuomi Takasaki, Sagamihara (JP);
Naoya Ishizawa, Saitama (JP)

(73) Assignee: NIKON CORPORATION, Tokyo (JP)

( * ) Notice: Subject to any disclaimer, the term of this patent is extended or adjusted under 35 U.S.C. 154(b) by 1178 days.

This patent is subject to a terminal disclaimer.

(21) Appl. No.: 17/256,559

(22) PCT Filed: Jun. 29, 2018

(86) PCT No.: PCT/JP2018/024910
§ 371 (c)(1),
(2) Date: Jul. 13, 2021

(87) PCT Pub. No.: WO2020/003520
PCT Pub. Date: Jan. 2, 2020

(65) Prior Publication Data
US 2021/0346887 A1 Nov. 11, 2021

(51) Int. Cl.
*B01L 3/00* (2006.01)
(52) U.S. Cl.
CPC ... *B01L 3/502738* (2013.01); *B01L 3/502715* (2013.01); *B01L 3/50273* (2013.01); *B01L 2200/027* (2013.01); *B01L 2400/0622* (2013.01)

(58) Field of Classification Search
CPC ......... B01L 3/502738; B01L 3/502715; B01L 3/50273; B01L 2200/027;
(Continued)

(56) References Cited

U.S. PATENT DOCUMENTS 11,982,602 B2 * 5/2024 Kobayashi ............... G01N 1/38
2006/0275184 A1 * 12/2006 Furukawa ......... B01L 3/502776
422/129

(Continued)

FOREIGN PATENT DOCUMENTS

JP     2007225438 A * 9/2007
JP     2008224499 A * 9/2008

OTHER PUBLICATIONS

International Search Report for International Application No. PCT/JP2018/024910 mailed Aug. 14, 2018; with English translation, 4 pages.

(Continued)

*Primary Examiner* — John McGuirk
(74) *Attorney, Agent, or Firm* — Squire Patton Boggs (US) LLP (57) ABSTRACT

An object of the present invention is to provide a fluidic device in which a solution can be introduced into a flow path and be quantified while preventing air bubbles from being generated.
A pair of substrates are provided which are stacked in a thickness direction and in which one substrate includes a flow path constituted by being covered by another substrate. The flow path includes a quantification part that is able to quantify a solution to a predetermined amount. The quantification part includes: a pair of merging/branching portions each of which is surrounded by a contour that matches each of line segments connecting apex positions of an equilateral triangle in a view of the thickness direction or a contour parallel to each of the line segments and at which merging or branching of the solution is performed; and a connection portion that connects the pair of merging/branching portions via one of the apex positions of the equilateral triangle of the merging/branching portion. A valve which regulates a fluid (Continued)

flow in the flow path is provided at the apex position in the merging/branching portion at which the connection portion is not arranged.

15 Claims, 6 Drawing Sheets

(58) Field of Classification Search
CPC ..... B01L 2400/0622; B01L 2200/0605; B01L 2300/0874; B01L 2400/0487; G01N 35/08; G01N 37/00
See application file for complete search history.

(56) References Cited

U.S. PATENT DOCUMENTS

2021/0346886 A1* 11/2021 Kobayashi .......... F16K 99/0015
2022/0003644 A1* 1/2022 Kobayashi ............... G01N 1/38

OTHER PUBLICATIONS

Written Opinion of the International Searching Authority for International Application No. PCT/JP2018/024910 mailed Aug. 14, 2018; with English translation, 9 pages.
Hong, et al: "A nanoliter-scale nucleic acid processor with parallel architecture", Nature Biotechnology Letters; Apr. 2004 (online Mar. 14, 2004); vol. 22(4), pp. 435-439.

* cited by examiner

FLUIDIC DEVICE AND SYSTEM

CROSS-REFERENCE

This application is a 35 USC 371 national phase filing of PCT/JP2018/024910, filed Jun. 29, 2018.

TECHNICAL FIELD

The present invention relates to a fluidic device and a system.

BACKGROUND

Recently, attention has focused on the development of μ-TAS (Micro-Total Analysis Systems) and the like aiming at an increase in speed, an increase in efficiency, and an increase in the degree of integration of tests in the field of in-vitro diagnosis or ultra-miniaturization of testing equipment, and active research has been conducted worldwide.

The μ-TAS are superior to testing equipment of the related art in that the μ-TAS can perform measurements and analyses with a small amount of sample, can be carried, are disposable at low cost, and the like.

Further, as a highly useful method when using expensive reagents or when testing a small amount of multiple samples, μ-TAS has attracted attention.

A device that includes a flow path and a pump arranged on the flow path has been reported as a component of μ-TAS (Non-Patent Document 1).

In such a device, by injecting a plurality of solutions into the flow path and operating the pump, the plurality of solutions are mixed in the flow path.

RELATED ART DOCUMENTS

Non-Patent Document

[Non-Patent Document 1] Jong Wook Hong, Vincent Studer, Giao Hang, W French Anderson and Stephen R Quake, Nature Biotechnology 22, 435-439 (2004)

SUMMARY OF INVENTION

According to a first aspect of the present invention, a fluidic device is provided, including a pair of substrates which are stacked in a thickness direction and in which one substrate includes a flow path constituted by being covered by another substrate, wherein the flow path includes a quantification part that is able to quantify a solution to a predetermined amount, the quantification part including: a pair of merging/branching portions each of which is surrounded by a contour that matches each of line segments connecting apex positions of an equilateral triangle in a view of the thickness direction or a contour parallel to each of the line segments and at which merging or branching of the solution is performed; and a connection portion that connects the pair of merging/branching portions via one of the apex positions of the equilateral triangle of the merging/branching portion, and a valve which regulates a fluid flow in the flow path is provided at the apex position in the merging/branching portion at which the connection portion is not arranged.

According to a second aspect of the present invention, a system is provided, including: the fluidic device according to the first aspect of the present invention; and a supply part which is able to independently supply a force that deforms the valve to each valve when set to the fluidic device.

DESCRIPTION OF EMBODIMENTS

Hereinafter, embodiments of a fluidic device and a system of the present invention will be described with reference to FIG. 1 to FIG. 8. In the drawings used in the following description, in order to make the features easy to understand, in some cases, the featured parts may be enlarged for convenience, and size ratios or the like of components may not be the same as the actual ones.

Figure 1:
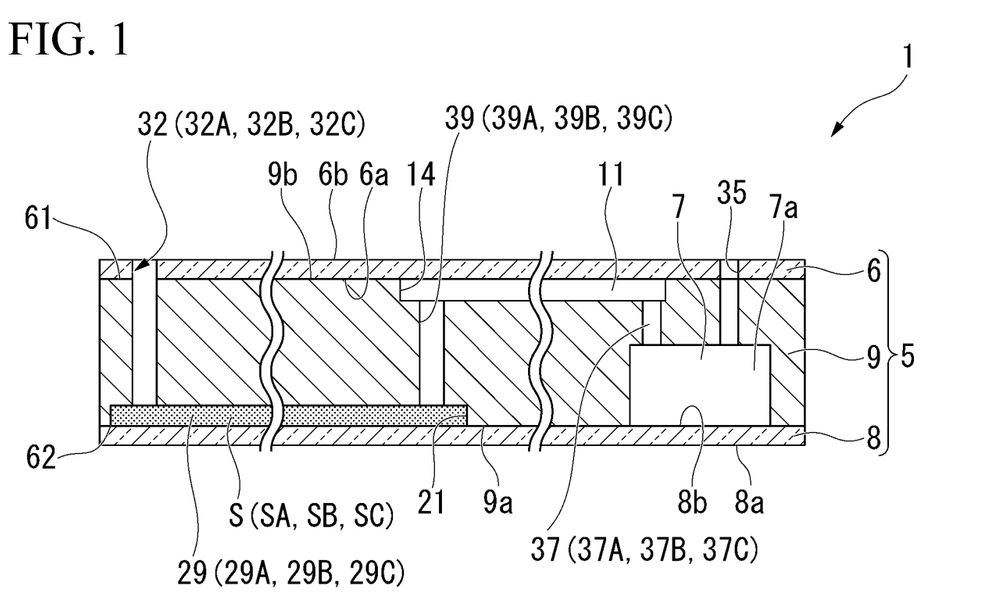
FIG. 1 is a cross-sectional view schematically showing a fluidic device according to an embodiment.
Figure 2:
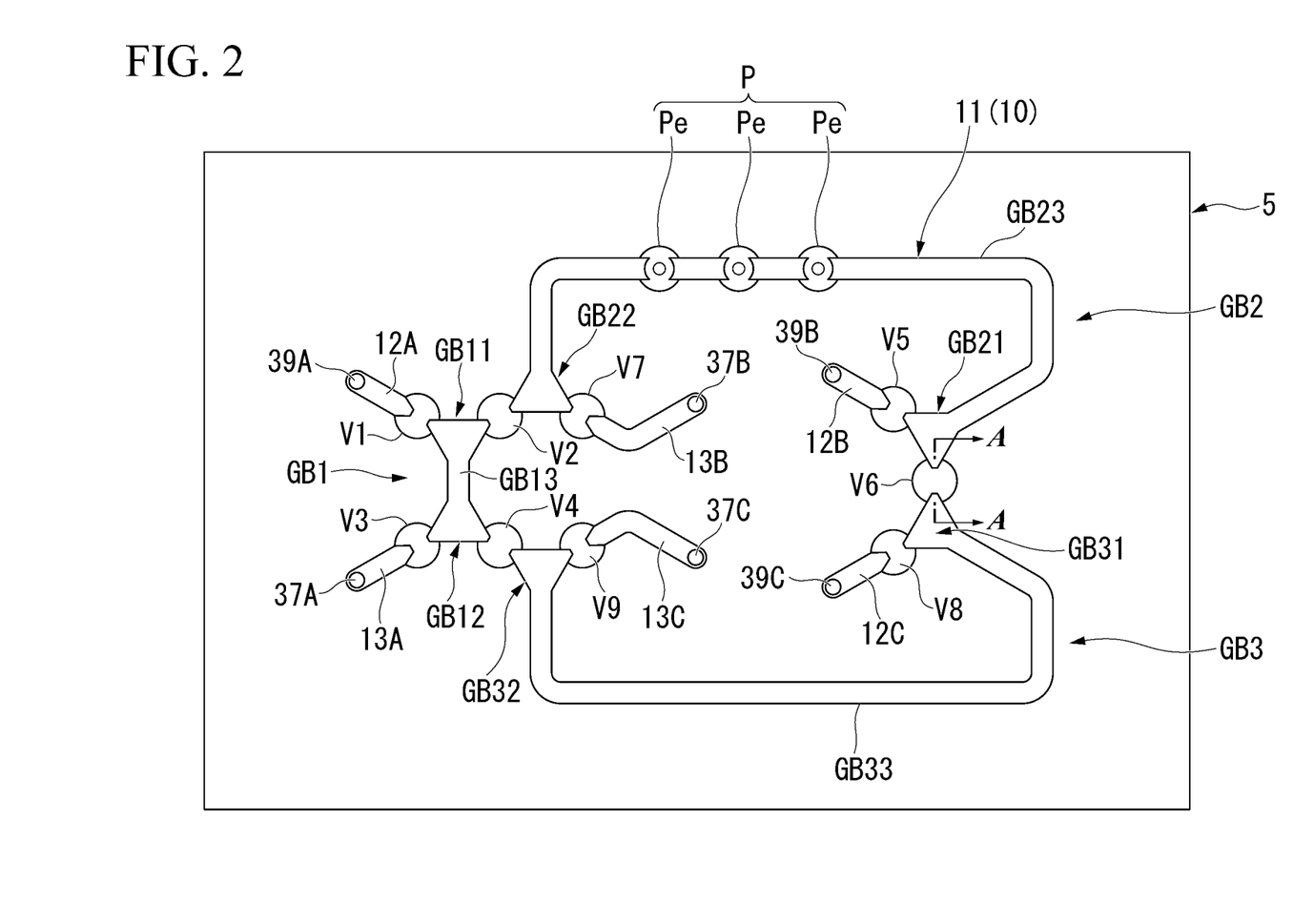
FIG. 2 is a plan view schematically showing the fluidic device according to the embodiment.

FIG. 1 is a schematic cross-sectional view of a fluidic device 1 according to the present embodiment. FIG. 2 is a plan view schematically showing an example of a flow path provided on the fluidic device 1. FIG. 2 is shown in a state where each part arranged on the lower side is seen through a transparent upper plate 6.

The fluidic device 1 of the present embodiment includes a device that detects a sample substance which is a detection target included in a specimen sample by an immune reaction, an enzymatic reaction, and the like. The sample substance is, for example, a biomolecule such as nucleic acid, DNA, RNA, a peptide, a protein, or an extracellular endoplasmic reticulum.

As shown in FIG. 2, the fluidic device 1 includes a base material 5 and a plurality of valves V1 to V9. Further, as shown in FIG. 1, the base material 5 has three substrates (a first base material 6, a second base material 9, and a third base material 8) stacked in a thickness direction. The first base material 6, the third base material 8, and the second base material 9 of the present embodiment are constituted of a resin material. Examples of the resin material that constitutes the first base material 6, the third base material 8, and the second base material 9 include polypropylene, polycarbonate, and the like. Further, in the present embodiment, the first base material 6 and the third base material 8 are constituted of a transparent material. The materials that constitute the first base material 6, the third base material 8, and the second base material 9 are not limited.

In the following description, it is assumed that the first base material (for example, a first substrate (substrate), a lid part, an upper part or a lower part of the flow path, an upper surface or a bottom surface of the flow path) 6, the third base material (for example, a third substrate (substrate), a lid part, an upper part or a lower part of the flow path, an upper surface or a bottom surface of the flow path) 8, and the second base material (a second substrate) 9 are arranged along a horizontal plane, the first base material 6 is arranged above the second base material 9, and the third base material 8 is arranged below the second base material 9. However, this merely defines a horizontal direction and a vertical direction for convenience of explanation and does not limit the orientation when the fluidic device 1 according to the present embodiment is used.

The first base material 6, the second base material 9, and the third base material 8 are plate materials that extend along the horizontal direction. The first base material 6, the second base material 9, and the third base material 8 are stacked in this order along the vertical direction. That is, the second base material 9 is stacked on the first base material 6 at the lower side of the first base material 6. The third base material 8 is stacked on the second base material 9 at a surface (a lower surface 9a) on the opposite side of the first base material 6.

In the following description, a direction in which the first base material 6, the second base material 9, and the third base material 8 are stacked is simply referred to as a stacking direction. In the present embodiment, the stacking direction is the vertical direction. In the present embodiment, the stacking direction is the thickness direction of the substrate (the first base material 6, the second base material 9, and the third base material 8).

The first base material 6 has an upper surface 6b and a lower surface 6a. The second base material 9 has an upper surface 9b and the lower surface 9a. Similarly, the third base material 8 has an upper surface 8b and a lower surface 8a.

The lower surface 6a of the first base material 6 faces and is in contact with the upper surface 9b of the second base material 9 in the stacking direction. The lower surface 6a of the first base material 6 and the upper surface 9b of the second base material 9 are joined to each other by joining means such as adhesion. The lower surface 6a of the first base material 6 and the upper surface 9b of the second base material 9 constitute a first boundary surface 61. That is, the first base material 6 and the second base material 9 are joined together at the first boundary surface 61.

Similarly, the upper surface 8b of the third base material 8 faces and is in contact with the lower surface 9a of the second base material 9 in the stacking direction. The upper surface 8b of the third base material 8 and the lower surface 9a of the second base material 9 are joined to each other by joining means such as adhesion. The upper surface 8b of the third base material 8 and the lower surface 9a of the second base material 9 constitute a second boundary surface 62. That is, the second base material 9 and the third base material 8 are joined together at the second boundary surface 62.

An injection hole 32, a reservoir 29, a flow path 11, a waste liquid tank 7, a discharge hole 37, an air hole 35, and a supply hole 39 are provided on the base material 5.

The injection hole 32 penetrates through the first base material 6 and the second base material 9. The injection hole 32 is connected to the reservoir 29 located at a boundary part between the second base material 9 and the third base material 8. The injection hole 32 connects the reservoir 29 to the outside. A solution is filled in the reservoir 29 via the injection hole 32. One injection hole 32 is provided for one reservoir 29. In FIG. 2, the injection hole 32 is not shown.

The reservoir 29 is a space formed in a tube shape or a cylindrical shape surrounded by the third base material 8 and an inner wall surface of a groove part 21 provided on the lower surface 9a of the second base material 9. That is, the reservoir 29 is located at the second boundary surface 62. A plurality of reservoirs 29 are provided on the base material 5 of the present embodiment. The solution is accommodated in the reservoir 29. The plurality of reservoirs 29 accommodate the solution independently of each other. The reservoir 29 supplies the accommodated solution to the flow path 11. The reservoir 29 of the present embodiment is a flow path type reservoir. One end of the reservoir 29 in a longitudinal direction is connected to the injection hole 32. The supply hole 39 is connected to another end of the reservoir 29 in the longitudinal direction.

The present embodiment is described using a case in which by providing the groove part 21 in the second base material 9 and covering an opening of the groove part 21 by the third base material 8, the reservoir 29 is constituted. However, the reservoir 29 may be constituted by covering an opening of a groove part provided in the third base material 8 by the second base material 9.

The flow path 11 is a space formed in a tube shape or a cylindrical shape surrounded by an inner wall surface of a groove part 14 provided on the upper surface 9b of the second base material 9 as one substrate and the first base material 6 as another substrate. That is, the flow path 11 is located at the first boundary surface 61. A solution is supplied to the flow path 11 from the reservoir 29. The solution flows in the flow path 11.

The present embodiment is described using a case in which by providing the groove part 14 in the second base material 9 and covering an opening of the groove part 14 by the first base material 6, the flow path 11 is constituted. However, the flow path 11 may be constituted by covering an opening of a groove part provided in the first base material 6 by the second base material 9. That is, the base material 5 may have a pair of substrates stacked in the thickness direction, and the flow path 11 may be constituted by covering a groove part provided on one of the pair of substrates by another substrate.

Each part of the flow path 11 will be described later in detail on the basis of FIG. 2.

The supply hole 39 is provided in the second base material 9. The supply hole 39 penetrates through the second base material 9 in a plate thickness direction. The supply hole 39 connects the reservoir 29 to the flow path 11. The solution stored in the reservoir 29 is supplied to the flow path 11 via the supply hole 39. That is, the reservoir 29 is connected to the flow path 11 via the supply hole 39.

The waste liquid tank 7 is provided on the base material 5 in order to discard the solution in the flow path 11. The waste liquid tank 7 is constituted to be a space which is surrounded by an inner wall surface of a recess part 7a that is provided on the lower surface 9a side of the second base material 9 and the third base material 8 that covers an opening facing the lower side of the recess part 7a.

The discharge hole 37 is provided in the second base material 9. The discharge hole 37 penetrates through the second base material 9 in the plate thickness direction. The discharge hole 37 connects the waste liquid tank 7 to the flow path 11. The solution in the flow path 11 is discharged to the waste liquid tank 7 via the discharge hole 37. That is, the waste liquid tank 7 is connected to the flow path 11 via the discharge hole 37.

The air hole 35 penetrates through the first base material 6 and the second base material 9. The air hole 35 is connected to the waste liquid tank 7. The air hole 35 connects the waste liquid tank 7 to the outside. That is, the waste liquid tank 7 is opened to the outside via the air hole 35.

Next, the flow path 11 will be described further specifically.

As shown in FIG. 2, the flow path 11 includes a circulation flow path 10, a plurality of (three in an example of FIG. 2) introduction flow paths 12A, 12B, 12C, and a plurality of (three in the example of FIG. 2) discharge flow paths 13A, 13B, 13C. A solution is introduced to the flow path 11 from the reservoir 29 (refer to FIG. 1).

The circulation flow path 10 is constituted in a loop shape when viewed from the stacking direction. A pump P and a plurality of (three in the example of FIG. 2) quantification parts GB1, GB2, GB3 each of which is able to quantify the solution to a predetermined amount are arranged in a route of the circulation flow path 10.

The quantification part GB1 includes merging/branching portions GB11, GB12 having a substantially equilateral triangle shape and a connection portion GB13 that connects the merging/branching portions GB11, GB12. The quantification part GB2 includes merging/branching portions GB21, GB22 having a substantially equilateral triangle shape and a connection portion GB23 that connects the merging/branching portions GB21, GB22. The quantification part GB3 includes merging/branching portions GB31, GB32 having a substantially equilateral triangle shape and a connection portion GB33 that connects the merging/branching portions GB31, GB32. That is, each of the quantification parts GB1, GB2, GB3 is part of the circulation flow path.

One of the apexes of the merging/branching portion GB11 of the quantification part GB1 and one of the apexes of the merging/branching portion GB22 of the quantification part GB2 are connected via a valve V2. One of the apexes of the merging/branching portion GB12 of the quantification part GB1 and one of the apexes of the merging/branching portion GB32 of the quantification part GB3 are connected via a valve V4. One of the apexes of the merging/branching portion GB21 of the quantification part GB2 and one of the apexes of the merging/branching portion GB31 of the quantification part GB3 are connected via a valve V6. In this way, the flow path 11 includes the quantification parts GB1, GB2, GB3, and the circulation flow path 10 is formed by connecting a merging/branching portion arranged on both ends of each of the quantification parts GB1, GB2, GB3 to a merging/branching portion of another quantification part via a valve.

The pump P is constituted of three element pumps Pe that are arranged side by side in the flow path 11 of the quantification part GB2. The element pump Pe is a so-called valve pump. The pump P can transport a liquid in the circulation flow path by sequentially opening and closing the three element pumps Pe. The number of element pumps Pe that constitute the pump P may be four or more.

Figure 3:
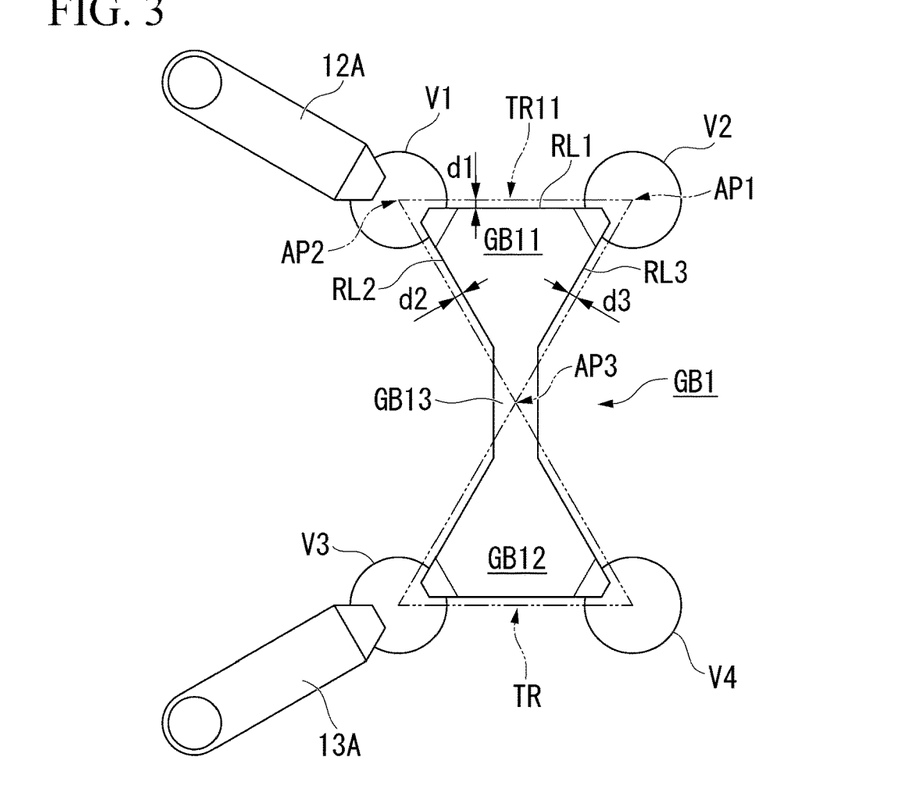
FIG. 3 is a partial plan view schematically showing the fluidic device according to the embodiment.

FIG. 3 is a plan view seen in the stacking direction showing the detail of the quantification part GB1.

As shown in FIG. 3, the merging/branching portions GB11, GB12 are spaces having an upper surface and a bottom surface having a substantially equilateral triangle shape. Here, the substantially equilateral triangle means that the longest three sides each forms an angle of 60 degrees with another side. The longest three sides of the merging/branching portions GB11, GB12 are line segments that overlap or are parallel to each side of equilateral triangles TR11, TR12 indicated by a two-dot chain line. Each of the apexes other than AP3 that becomes a contact point of the equilateral triangles TR11, TR12 among the apexes of the equilateral triangles TR11, TR12 coincides with a center of the valves V1 to V4 (details will be described later). Hereinafter, an equilateral triangle at each merging/branching portion corresponding to the equilateral triangles TR11, TR12 is referred to as a "reference equilateral triangle."

The three longest sides among the contours of the upper and bottom surfaces of the merging/branching portions GB11, GB12 of the present embodiment overlap each side of the equilateral triangle deviated by a predetermined distance to the inside of the equilateral triangles TR11, TR12. The magnitude of this deviation is referred to as an offset amount.

The upper surface and the bottom surface that constitute the merging/branching portions GB11, GB12 are equilateral triangles having the same size and completely overlap each other in the stacking direction view.

The upper surface and the bottom surface that constitute the merging/branching portions GB11, GB12 are equilateral triangles in which the upper surface is larger than the bottom surface, and the small equilateral triangle which becomes the bottom surface may be arranged inside the large equilateral triangle which becomes the upper surface in the stacking direction view. At this time, the side surface that constitutes the merging/branching portions GB11, GB12 is inclined in an inward direction from the upper surface to the bottom surface.

The offset amount described above is about 0.1 mm to 0.2 mm as an example. The lengths of the sides of the equilateral triangles TR11, TR12 are substantially the same. The merging/branching portions GB11, GB12 may be larger or may be smaller than the equilateral triangles TR11, TR12. The offset amount may be the same or may be different for each side of the equilateral triangle. Offset amounts d1 to d3 are distances between the contours RL1 to RL3 of the merging/branching portion GB and the line segments connecting the apex positions AP1 to AP3. Since the offset can enlarge a contact area of an elastomer of a diaphragm member of the valve, it is possible to further stably seal the valve. Further, the volume of the branching portion can be finely adjusted by the offset. For example, even if the valve size is common in the plurality of merging/branching portions, the branching portions having different volumes can be obtained by changing the offset amount. Further, the offset amount may be such that the distance of at least one of the three sides is different from the distance of another side. When this configuration is employed, it is possible to differentiate liquid contact areas of the valves, and it is possible to improve an internal pressure resistance of a valve having a small liquid contact area.

The connection portion GB13 connects the merging/branching portions GB11, GB12. The connection portion GB13 is formed of a groove having a straight line shape. The merging/branching portions GB11, GB12 and the connection portion GB13 of the present embodiment are formed to have the same depth. The area and the depth (that is, the volume) of the merging/branching portions GB11, GB12 and the connection portion GB13 are set in accordance with the volume of the solution quantified in the quantification part GB1.

The valves V1, V2 are arranged at apex positions where the connection portion GB13 is not arranged in the merging/branching portion GB11. The merging/branching portion GB11 is connected to the introduction flow path 12A via the valve V1 and is capable of being connected to or is capable of being shielded from the introduction flow path 12A in response to the opening and closing of the valve V1. The merging/branching portion GB11 is capable of being connected to or is capable of being shielded from the merging/branching portion GB22 in response to the opening and closing of the valve V2.

That is, the merging/branching portion GB11 is able to cause the solution to flow in from two flow paths among the connection portion GB13, the introduction flow path 12A, and the merging/branching portion GB22 and to be merged and send the solution to another flow path. Further, the merging/branching portion GB11 is able to branch the solution that is introduced from one flow path among the connection portion GB13, the introduction flow path 12A, and the merging/branching portion GB22 to the other two flow paths.

The valves V3, V4 are arranged at apex positions where the connection portion GB13 is not arranged in the merging/branching portion GB12. The merging/branching portion GB12 is connected to the discharge flow path 13A via the valve V3 and is capable of being connected to or is capable of being shielded from the discharge flow path 13A in response to the opening and closing of the valve V3. The merging/branching portion GB12 is capable of being connected to or is capable of being shielded from the merging/branching portion GB32 in response to the opening and closing of the valve V4.

That is, the merging/branching portion GB12 is able to cause the solution to flow in from two flow paths among the connection portion GB13, the discharge flow path 13A, and the merging/branching portion GB32 and to be merged. Further, the merging/branching portion GB12 is able to branch the solution that is introduced from one flow path among the connection portion GB13, the discharge flow path 13A, and the merging/branching portion GB32 to the other two flow paths.

The quantification part GB1 is able to perform quantification compartmenting of the solution for the volume of the merging/branching portions GB11, GB12 and the connection portion GB13 by closing the valves V1 to V4. For example, in a state where one of the valve V1 and the valve V2 is opened and another of the valves is closed in the merging/branching portion GB11 and one of the valve V3 and the valve V4 is opened and another of the valves is closed in the merging/branching portion GB12, by causing a solution to flow in from one of the flow paths connected to the opened valves, causing the solution to flow out toward another of the flow paths connected to the opened valves, and then closing the opened valve, the quantification part GB1 is able to perform quantification compartmenting of the solution for the volume of the merging/branching portions GB11, GB12 and the connection portion GB13.

Since the configuration of the pair of merging/branching portions GB21, GB22 in the quantification part GB2 and the configuration of the pair of merging/branching portions GB31, GB32 in the quantification part GB3 are similar to the pair of merging/branching portions GB11, GB12 in the quantification part GB1, the explanation thereof is simplified.

The connection portion GB23 in the quantification part GB2 connects the merging/branching portions GB21, GB22. The connection portion GB13 is formed of a groove that forms part of the circulation flow path 10. The merging/branching portions GB21, GB22 and the connection portion GB23 of the present embodiment are formed to have the same depth. The area and the depth (that is, the volume) of the merging/branching portions GB21, GB22 and the connection portion GB23 are set in accordance with the volume of the solution quantified in the quantification part GB2.

As shown in FIG. 2, the merging/branching portion GB21 and the merging/branching portion GB22 are arranged at positions that do not overlap each other in a stacking direction view. The valves V5, V6 are arranged at apex positions where the connection portion GB23 is not arranged in the merging/branching portion GB21. The merging/branching portion GB21 is connected to the introduction flow path 12B via the valve V5 and is capable of being connected to or is capable of being shielded from the introduction flow path 12B in response to the opening and closing of the valve V5. The merging/branching portion GB21 is capable of being connected to or is capable of being shielded from the merging/branching portion GB31 in response to the opening and closing of the valve V6.

That is, the merging/branching portion GB21 is able to cause the solution to flow in from two flow paths among the connection portion GB23, the introduction flow path 12B, and the merging/branching portion GB31 and to be merged. Further, the merging/branching portion GB21 is able to branch the solution that is introduced from one flow path among the connection portion GB23, the introduction flow path 12B, and the merging/branching portion GB31 to the other two flow paths.

The valves V2, V7 are arranged at apex positions where the connection portion GB23 is not arranged in the merging/branching portion GB22. One of the apex positions of the reference equilateral triangle in the merging/branching portion GB11 and one of the apex positions of the reference equilateral triangle in the merging/branching portion GB22 are arranged at the same position. The valve V2 is arranged at the apex position overlapped in the merging/branching portions GB11, GB22.

The merging/branching portion GB22 is capable of being connected to or is capable of being shielded from the merging/branching portion GB11 in response to the opening and closing of the valve V2. The merging/branching portion GB22 is connected to the discharge flow path 13B via the valve V7 and is capable of being connected to or is capable of being shielded from the discharge flow path 13B in response to the opening and closing of the valve V7.

That is, the merging/branching portion GB22 is able to cause the solution to flow in from two flow paths among the connection portion GB23, the discharge flow path 13B, and the merging/branching portion GB11 and to be merged. Further, the merging/branching portion GB22 is able to branch the solution that is introduced from one flow path among the connection portion GB23, the discharge flow path 13B, and the merging/branching portion GB11 to the other two flow paths.

The quantification part GB2 is able to perform quantification compartmenting of the solution for the volume of the merging/branching portions GB21, GB22 and the connection portion GB23 by closing the valves V2, V5 to V7.

The connection portion GB33 in the quantification part GB3 connects the merging/branching portions GB31, GB32. The connection portion GB33 is formed of a groove that forms part of the circulation flow path 10. The merging/branching portions GB31, GB32 and the connection portion GB33 of the present embodiment are formed to have the same depth. The area and the depth (that is, the volume) of the merging/branching portions GB31, GB32 and the connection portion GB33 are set in accordance with the volume of the solution quantified in the quantification part GB3.

The merging/branching portion GB31 and the merging/branching portion GB32 are arranged at positions that do not overlap each other in a stacking direction view. Valves V6, V8 are arranged at apex positions where the connection portion GB33 is not arranged in the merging/branching portion GB31. One of the apex positions of the reference equilateral triangle in the merging/branching portion GB31 and one of the apex positions of the reference equilateral triangle in the merging/branching portion GB21 are arranged at the same position. The valve V6 is arranged at the apex position overlapped in the merging/branching portions GB21, GB31.

The merging/branching portion GB31 is connected to the introduction flow path 12C via the valve V8 and is capable of being connected to or is capable of being shielded from the introduction flow path 12C in response to the opening and closing of the valve V8. The merging/branching portion GB31 is capable of being connected to or is capable of being shielded from the merging/branching portion GB21 in response to the opening and closing of the valve V6.

That is, the merging/branching portion GB31 is able to cause the solution to flow in from two flow paths among the connection portion GB33, the introduction flow path 12C, and the merging/branching portion GB21 and to be merged. Further, the merging/branching portion GB31 is able to branch the solution that is introduced from one flow path among the connection portion GB33, the introduction flow path 12C, and the merging/branching portion GB21 to the other two flow paths.

The valves V4, V9 are arranged at apex positions where the connection portion GB33 is not arranged in the merging/branching portion GB32. One of the apex positions of the reference equilateral triangle in the merging/branching portion GB12 and one of the reference apex positions in the merging/branching portion GB32 are arranged at the same position. The valve V4 is arranged at the apex position overlapped in the merging/branching portions GB12, GB32.

The merging/branching portion GB32 is capable of being connected to or is capable of being shielded from the merging/branching portion GB12 in response to the opening and closing of the valve V4. The merging/branching portion GB32 is connected to the discharge flow path 13C via the valve V9 and is capable of being connected to or is capable of being shielded from the discharge flow path 13C in response to the opening and closing of the valve V9.

That is, the merging/branching portion GB32 is able to cause the solution to flow in from two flow paths among the connection portion GB33, the discharge flow path 13C, and the merging/branching portion GB12 and to be merged. Further, the merging/branching portion GB32 is able to branch the solution that is introduced from one flow path among the connection portion GB33, the discharge flow path 13C, and the merging/branching portion GB12 to the other two flow paths.

The quantification part GB3 is able to perform quantification compartmenting of the solution for the volume of the merging/branching portions GB31, GB32 and the connection portion GB33 by closing the valves V4, V6, V8 to V9.

Further, by closing the valves V1, V3, V5, V7 to V9 and opening the other valves V2, V4, V6, the circulation flow path 10 in which the quantification parts GB1 to GB3 are connected is formed.

The center positions of the valves V1 to V9 and the apex positions of the reference equilateral triangles according to the merging/branching portions GB11 to GB12, GB21 to GB22, GB31 to GB32 are each arranged at a position selected from the predetermined number of index points arranged in a two-dimensional hexagonal lattice pattern.

The introduction flow path 12A is a flow path for introducing (transferring) the solution to the quantification part GB1 of the circulation flow path 10. The introduction flow path 12A is connected to a supply hole 39A at one end side and is connected to the valve V1 at another end side. The introduction flow path 12B is a flow path for introducing (transferring) the solution to the quantification part GB2 of the circulation flow path 10. The introduction flow path 12B is connected to a supply hole 39B at one end side and is connected to the valve V5 at another end side. The introduction flow path 12C is a flow path for introducing (transferring) the solution to the quantification part GB3 of the circulation flow path 10. The introduction flow path 12C is connected to a supply hole 39C at one end side and is connected to the valve V8 at another end side.

The discharge flow path 13A is a flow path for discharging (transferring) the solution of the quantification part GB1 of the circulation flow path 10 to the waste liquid tank 7. The discharge flow path 13A is connected to a discharge hole 37A at one end side and is connected to the valve V3 at another end side. The discharge flow path 13B is a flow path for discharging (transferring) the solution of the quantification part GB2 of the circulation flow path 10 to the waste liquid tank 7. The discharge flow path 13B is connected to a discharge hole 37B at one end side and is connected to the valve V7 at another end side. The discharge flow path 13C is a flow path for discharging (transferring) the solution of the quantification part GB3 of the circulation flow path 10 to the waste liquid tank 7. The discharge flow path 13C is connected to a discharge hole 37C at one end side and is connected to the valve V9 at another end side.

That is, the merging/branching portion GB11 is connectable to the introduction flow path 12A as a first transfer flow path at an apex position where the valve V1 is provided and is connectable to the merging/branching portion GB22 that forms part of the circulation flow path 10 as a second transfer flow path at an apex position where the valve V2 is provided. The merging/branching portion GB12 is connectable to the discharge flow path 13A as a first transfer flow path at an apex position where the valve V3 is provided and is connectable to the merging/branching portion GB32 that forms part of the circulation flow path 10 as a second transfer flow path at an apex position where the valve V4 is provided.

The merging/branching portion GB21 is connectable to the introduction flow path 12B as a first transfer flow path at an apex position where the valve V5 is provided and is connectable to the merging/branching portion GB31 that forms part of the circulation flow path 10 as a second transfer flow path at an apex position where the valve V6 is provided. The merging/branching portion GB22 is connectable to the discharge flow path 13B as a first transfer flow path at an apex position where the valve V7 is provided and is connectable to the merging/branching portion GB11 that forms part of the circulation flow path 10 as a second transfer flow path at an apex position where the valve V2 is provided.

The merging/branching portion GB31 is connectable to the introduction flow path 12C as a first transfer flow path at an apex position where the valve V8 is provided and is connectable to the merging/branching portion GB21 that forms part of the circulation flow path 10 as a second transfer flow path at an apex position where the valve V6 is provided. The merging/branching portion GB32 is connectable to the discharge flow path 13C as a first transfer flow path at an apex position where the valve V9 is provided and is connectable to the merging/branching portion GB12 that forms part of the circulation flow path 10 as a second transfer flow path at an apex position where the valve V4 is provided.

Figure 4:
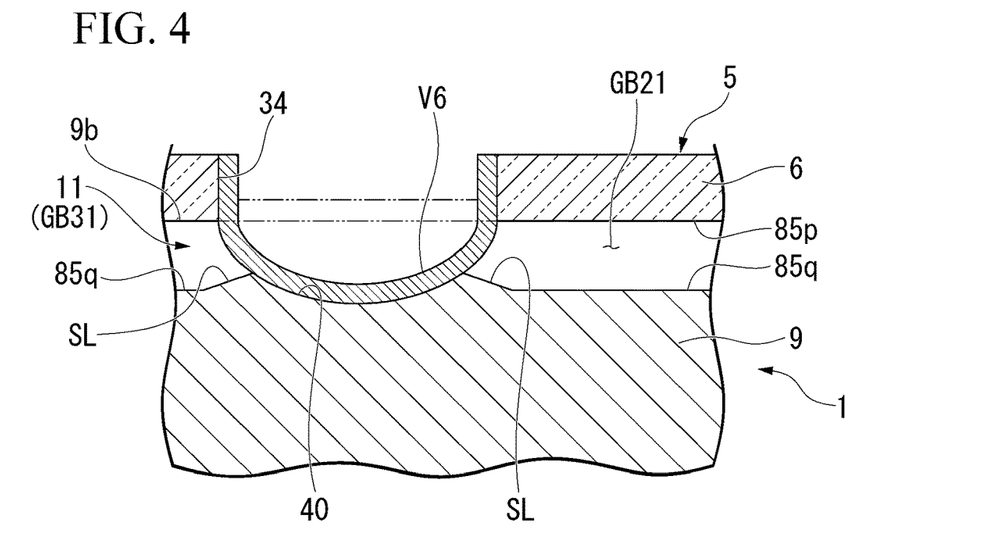
FIG. 4 is a cross-sectional view taken along a line A-A of a base material 5 in FIG. 2.

FIG. 4 is a cross-sectional view taken along a line A-A of the base material 5 in FIG. 2. Although the structures of the merging/branching portions GB21, GB31 and the valve V6 are shown here as representatives, the merging/branching portions GB11, GB12, GB22, GB32 and the valves V1 to V5, V7 to V9 also have a similar configuration.

First, the structure of the valve V6 will be described.

As shown in FIG. 4, a valve-holding hole 34 that holds the valve V6 is provided on the first base material 6. The valve V6 is held by the first base material 6 in the valve-holding hole 34. The valve V6 is constituted of an elastic material. Examples of the elastic material that can be adopted for the valve V6 include rubber, an elastomer resin, or the like. A hemispherical recess 40 is provided in the flow path 11 directly below the valve V6. The recess 40 has a circular shape in plan view at the upper surface 9b of the second base material 9. For example, the diameter of the recess 40 at the upper surface 9b is preferably 1.0 to 3.0 mm.

The valve V6 elastically deforms downward, changes the cross-sectional area of the flow path, and thereby adjusts the flow of the solution in the flow path 11. The valve V6 elastically deforms downward, comes into contact with the recess 40, and thereby closes the flow path 11. Further, the valve V6 separates from the recess 40 and thereby opens the flow path 11 (a virtual line (two-dot chain line) of FIG. 4).

An inclined portion SL that is located at a boundary between the valve V6 (recess 40) and the merging/branching portions GB21, GB31 and that decreases the distance from a top surface 85p toward the valve V6 is provided on a bottom surface 85q of the merging/branching portions GB21, GB31. By providing the inclined portion SL, for example, as compared with a case where the inclined portion SL is not provided and there is a step (corner part) at the boundary between the bottom part of the recess 40 and the bottom surface 85q of the merging/branching portions GB21, GB31, it is possible to smoothly introduce the solution to the valve V6, and it is possible to effectively prevent residual air bubbles at the step (corner part).

The inclined portion SL described above is also provided at the boundary between each of the introduction flow paths 12A to 12C and the recess 40 and at the boundary between each of the discharge flow paths 13A to 13C and the recess 40. The inclined portion SL is particularly effective when the flow path 11 is flat and has lyophilic property to the solution. The flatness of the flow path 11 means that the depth of the flow path 11 is smaller than the width of the flow path 11.

Each inclined portion SL has a tapered shape in which the diameter is reduced at an angle of 60° toward the center of the valve. The maximum width W (refer to FIG. 6) of the inclined portion SL in the tapered shape is preferably about 0.5 to 1.5 mm.

In a case where the lowest position of the recess 40 is a higher position than the bottom surface 85q of the merging/branching portions GB21, GB31, the configuration in which the inclined portion SL is provided effectively works. However, in a case where the lowest position of the recess 40 is a lower position than the bottom surface 85q of the merging/branching portions GB21, GB31, the inclined portion SL may not be provided, and the bottom surface 85q and the recess 40 may cross with each other.

(Procedure of Supplying Solution from Reservoir to Flow Path 11)

Next, a procedure in which a solution S is supplied from the reservoir 29 to the flow path 11 in the fluidic device 1 will be described.

As shown in FIG. 1, the reservoir 29 is filled with the solution S in advance. In the measurement using the fluidic device 1, first, the solution S in the reservoir 29 is moved to the flow path 11. More specifically, the solution S is sequentially introduced from the reservoir 29 to each of the quantification parts GB1 to GB3 of the circulation flow path 10.

Figure 5:
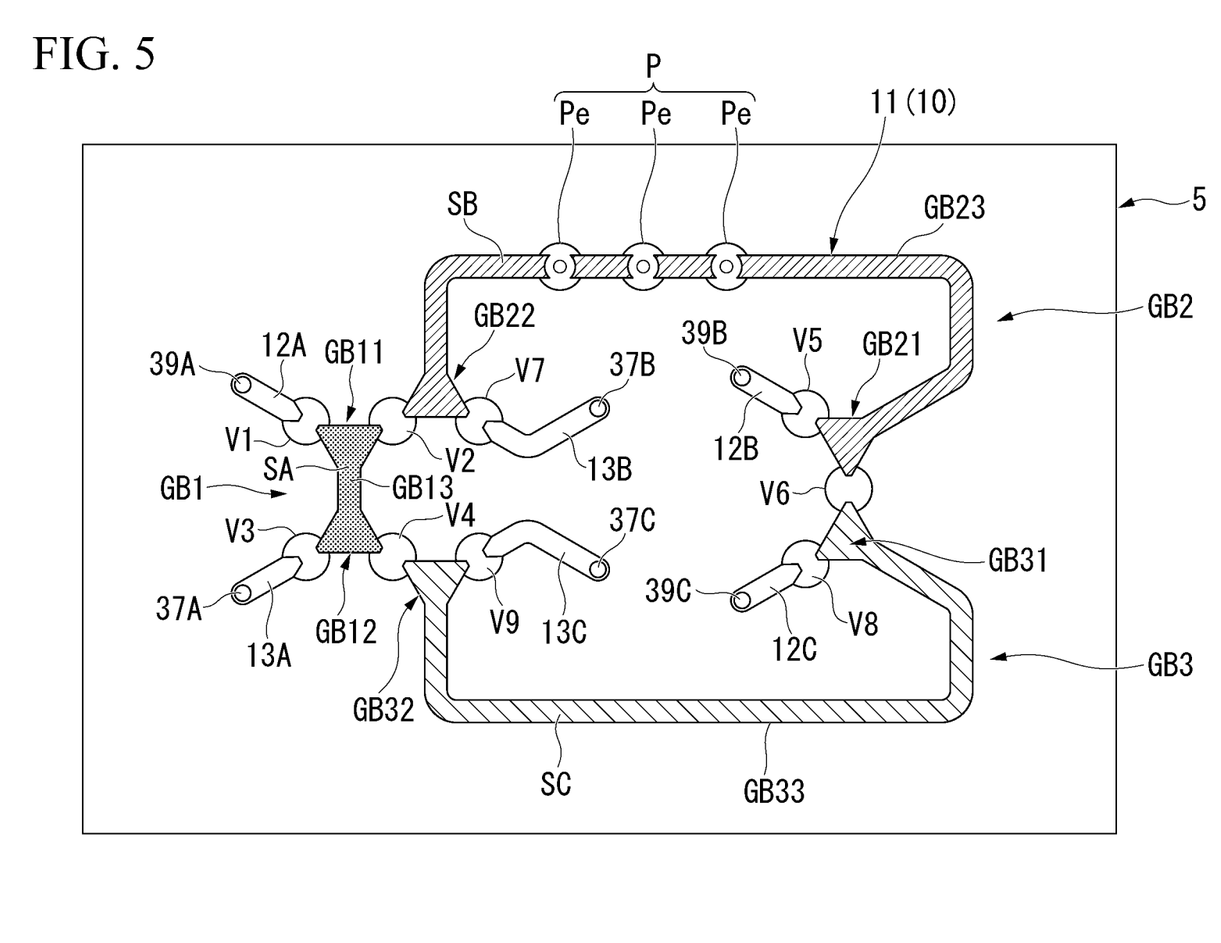
FIG. 5 is a plan view schematically showing the fluidic device according to the embodiment.

First, the opening and closing of the valves V1 to V9 when a solution SA is introduced to the quantification part GB1 will be described on the basis of FIG. 1 and FIG. 5. First, the valve V2 that compartments the quantification part GB1 from the quantification part GB2 and the valve V4 that compartments the quantification part GB1 from the quantification part GB3 are closed. The valve V1 that connects the quantification part GB1 to the introduction flow path 12A and the valve V3 that connects the quantification part GB1 to the discharge flow path 13A are opened.

Next, negative pressure suction is performed in the waste liquid tank 7 from the air hole 35 shown in FIG. 1 using a suction device (not shown). Thereby, the solution SA in a reservoir 29A moves to the flow path 11 side via the supply hole 39A. Further, air that has passed through an injection hole 32A is introduced behind the solution SA of the reservoir 29. Thereby, the solution SA accommodated in the reservoir 29A is introduced to the quantification part GB1 of the circulation flow path 10 via the supply hole 39A and the introduction flow path 12A. Then, by closing the valves V1, V3, the solution SA is quantified in the quantification part GB1.

When a solution SB is introduced to the quantification part GB2, the valve V6 is closed in addition to the valves V2, V4. Further, the valve V7 that is connected to the quantification part GB2 and the discharge flow path 13B is opened. Further, the valve V5 that is connected to the quantification part GB2 and the introduction flow path 12B is opened.

Then, the negative pressure suction is performed in the waste liquid tank 7 from the air hole 35 using the suction device. Thereby, the solution SB in a reservoir 29B moves to the flow path 11 side via the supply hole 39B. Further, air that has passed through an injection hole 32B is introduced behind the solution SB of the reservoir 29B. Thereby, the solution SB accommodated in the reservoir 29B is introduced to the quantification part GB2 of the circulation flow path 10 via the supply hole 39B and the introduction flow path 12B. Then, by closing the valves V5, V7, the solution SB is quantified in the quantification part GB2.

When a solution SC is introduced to the quantification part GB3, the valves V4, V6 are closed. Further, the valve V9 that is connected to the quantification part GB3 and the discharge flow path 13C is opened. Further, the valve V8 that is connected to the quantification part GB3 and the introduction flow path 12C is opened.

Then, the negative pressure suction is performed in the waste liquid tank 7 from the air hole 35 using the suction device. Thereby, the solution SC in a reservoir 29C moves to the flow path 11 side via the supply hole 39C. Further, air that has passed through an injection hole 32C is introduced behind the solution SC of the reservoir 29C. Thereby, the solution SC accommodated in the reservoir 29C is introduced to the quantification part GB3 of the circulation flow path 10 via the supply hole 39C and the introduction flow path 12C. Then, by closing the valves V8, V9, the solution SC is quantified in the quantification part GB3.

For example, when the solution SA is introduced to the quantification part GB1, the solution SA that is introduced from the introduction flow path 12A to the merging/branching portion GB11 via the valve V1 is introduced to the merging/branching portion GB12 via the connection portion GB13.

Here, since the inclined portion SL described above is provided at the boundary between the introduction flow path 12A and the valve V1, the solution can be smoothly introduced to and filled in the valve V1 in a state where residual air bubbles are prevented at the boundary between the introduction flow path 12A and the valve V1 (recess 40). Further, the merging/branching portion GB11 is formed in an equilateral triangle in plan view, and the distances from the valve V1 (recess 40) to the valve V2 and the connection portion GB13 that are located at other apex positions are the same. Therefore, the solution that is introduced to the merging/branching portion GB11 from the valve V1 arrives at the valve V2 and the connection portion GB13 at almost the same time as shown by a two-dot chain line in FIG. 6.

Figure 6:
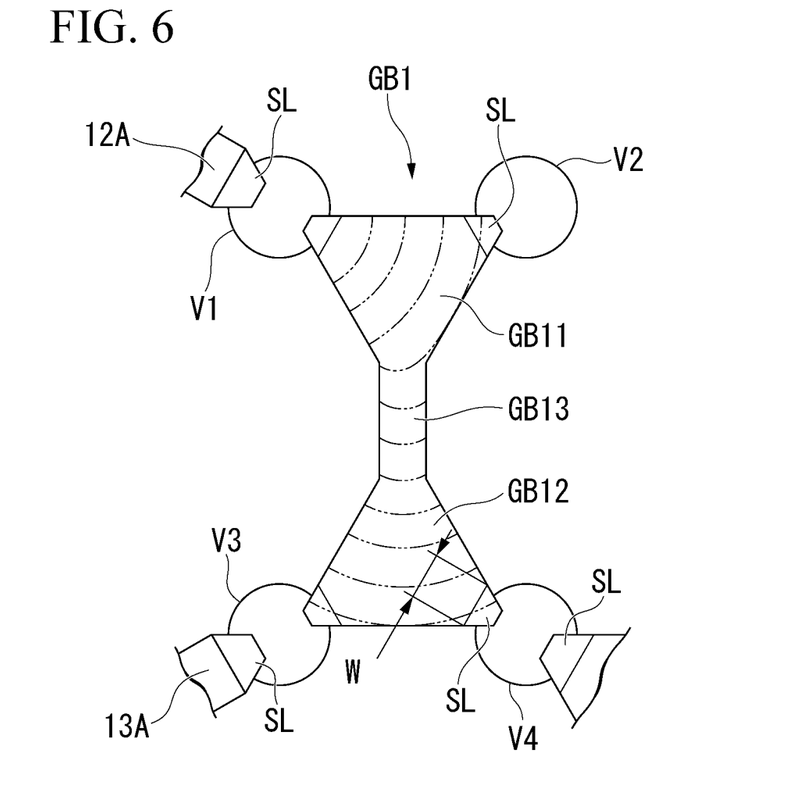
FIG. 6 is a partial plan view schematically showing the fluidic device according to the embodiment.

As a result, for example, it becomes possible to prevent a situation in which the solution that has arrived at the connection portion GB13 earlier flows to the connection portion GB13 and air bubbles remain in the vicinity of the valve V2.

Further, with respect to the merging/branching portion GB12 to which the solution is introduced via the connection portion GB13, the merging/branching portion GB12 is formed in an equilateral triangle in plan view, and the distances from the connection portion GB13 to the valves V3, V4 that are located at other apex positions are the same. Therefore, the solution that is introduced to the merging/branching portion GB12 from the connection portion GB13 arrives at the valves V3, V4 at almost the same time as shown by a two-dot chain line in FIG. 6.

As a result, for example, it becomes possible to prevent a situation in which the solution that has arrived at the valve V3 earlier flows to the discharge flow path 13A and air bubbles remain in the vicinity of the valve V4.

Accordingly, by closing the valves V1, V3 thereafter, it is possible to quantify the solution SA in a state where residual air bubbles are prevented in the quantification part GB1. Further, also in the quantification part GB2, similarly to the quantification part GB1, since the inclined portion SL is provided at the boundary between the introduction flow path 12B and the valve V5, and the merging/branching portions GB21, GB22 are formed in an equilateral triangle shape in plan view, the solution SB can be smoothly introduced to and filled in the valve V5 in a state where residual air bubbles are prevented at the boundary between the introduction flow path 12B and the valve V5 (recess 40), and the solution SB can be introduced from the merging/branching portion GB21 via the connection portion GB23 to the merging/branching portion GB22 in a state where residual air bubbles are prevented and be quantified.

Further, also in the quantification part GB3, similarly to the quantification parts GB1, GB2, since the inclined portion SL is provided at the boundary between the introduction flow path 12C and the valve V8, and the merging/branching portions GB31, GB32 are formed in an equilateral triangle shape in plan view, the solution SC can be smoothly introduced to and filled in the valve V8 in a state where residual air bubbles are prevented at the boundary between the introduction flow path 12C and the valve V8 (recess 40), and the solution SB can be introduced from the merging/branching portion GB31 via the connection portion GB33 to the merging/branching portion GB32 in a state where residual air bubbles are prevented and be quantified.

(Procedure of Mixing Solution in Flow Path 11)

Next, a procedure in which the solution that is supplied to the flow path of the fluidic device 1 is mixed will be described on the basis of FIG. 5. First, as described above, the valves V4, V6, V8 to V9 are closed, and the valves V2, V4, V6 are opened in a state where each of the solutions SA, SB, SC is introduced (quantified) to each of the quantification parts GB1, GB2, GB3, respectively, of the circulation flow path 10. Thereby, the circulation flow path 10 in which the quantification parts GB1, GB2, GB3 are connected is formed.

Then, the solutions SA, SB, SC in the circulation flow path 10 are sent and circulated using the pump P. In the solutions SA, SB, SC that circulate in the circulation flow path 10, due to an interaction (friction) between the solution and a flow path wall surface in the flow path, the flow rate around the wall surface is low, and the flow rate at the center of the flow path is high. As a result, since the flow rate of the solution can be distributed, the mixing and reaction of the solutions SA, SB, SC which are quantified in the quantification parts GB1, GB2, GB3, respectively, are promoted.

As described above, in the fluidic device 1 of the present embodiment, since the quantification parts GB1, GB2, GB3 are provided which include: the pair of merging/branching portions GB11, GB12 which are surrounded by a contour parallel to line segments that connect apex positions of an equilateral triangle and at which the solution merges or branches; the pair of merging/branching portions GB21, GB22; the pair of merging/branching portions GB31, GB32; and the connection portions GB13, GB23, GB33 that connect the pair of merging/branching portions via one of the apex positions in the pair of merging/branching portions, and the valves V1 to V9 are provided at the apex position at which the quantification parts GB1, GB2, GB3 are not arranged, the solutions SA, SB, SC can be introduced into the quantification parts GB1, GB2, GB3, respectively, and be quantified with high accuracy while preventing air bubbles from being generated.

Therefore, in the fluidic device 1 of the present embodiment, it becomes possible to perform high-accuracy measurement using the solutions SA, SB, SC that are quantified with high accuracy without being affected by air bubbles.

Further, in the fluidic device 1 of the present embodiment, since the inclined portion SL is provided at the boundary between the recess 40 in the valves V1 to V9, and the pair of merging/branching portions GB11, GB12, the pair of merging/branching portions GB21, GB22, and the pair of merging/branching portions GB31, GB32, as compared with a case where there is a step (corner part) at the boundary between the bottom part of the recess 40 and the bottom surface 85$q$ of the merging/branching portions described above, it is possible to smoothly introduce the solution to the valves V1 to V9, and it is possible to effectively prevent residual air bubbles at the step.

When a detection part is provided in the circulation flow path 10, it is possible to detect a sample substance included in a first solution. With respect to the term "detecting a sample substance", it is possible to directly or indirectly detect a sample substance. As an example of indirectly detecting a sample substance, the sample substance may be bound to a detection auxiliary material which assists the detection of the sample substance. When a labeling material (detection auxiliary material) is used, a solution that includes the sample substance which is mixed with the labeling material and which is bound to the detection auxiliary material may be used as the first solution. The detection part may be one that optically detects the sample substance, may include an objective lens and an imaging unit as an example, and the imaging unit may include, for example, an EMCCD (Electron-Multiplying Charge-Coupled Device) camera. The detection part may be one that electrochemically detects the sample substance and may include an electrode as an example.

Examples of the labeling material (detection auxiliary material) include fluorescent dyes, fluorescent beads, fluorescent proteins, quantum dots, gold nanoparticles, biotin, antibodies, antigens, energy-absorbing materials, radioactive isotopes, chemical luminescent bodies, enzymes, and the like.

Examples of the fluorescent dyes include FAM (carboxyfluorescein), JOE (6-carboxy-4',5'-dichloro 2',7'-dimethoxyfluorescein), FITC (fluorescein isothiocyanate), TET (tetrachlorofluorescein), HEX (5'-hexachloro-fluorescein-CE phosphoramidite), Cy3, Cy5, Alexa 568, Alexa 647, and the like.

Examples of the enzymes include alkaline phosphatase, peroxidase, and the like.

Further, when a capture part that can capture the sample substance described above is provided in the circulation flow path 10, it is possible to efficiently detect the sample substance by the detection part. It is possible to concentrate the sample substance by discharging the solution from second flow paths 120A to 120E while continuing the capture of the sample substance. Further, it is possible to wash the sample substance that is captured by the capture part by introducing a washing solution to the circulation flow path 10 and circulating the washing solution while continuing the capture of the sample substance.

The capture part can collect the sample substance from the solution that circulates in the circulation flow path 10 by capturing the sample substance itself or carrier particles bound to the sample substance. The capture part is, for example, a magnetic force generation source such as a magnet. The carrier particles are, for example, magnetic beads or magnetic particles.

Further, by providing a circulation flow path that is different from the circulation flow path 10 in the fluidic device 1 as a reaction part and providing the detection part, the capture part, and the like described above in the reaction part, for example, it becomes possible to perform a desired reaction such as the detecting, capturing, washing, or diluting.

[System]

Next, a system SYS that includes the fluidic device 1 described above will be described with reference to FIG. 7 and FIG. 8.

Figure 7:
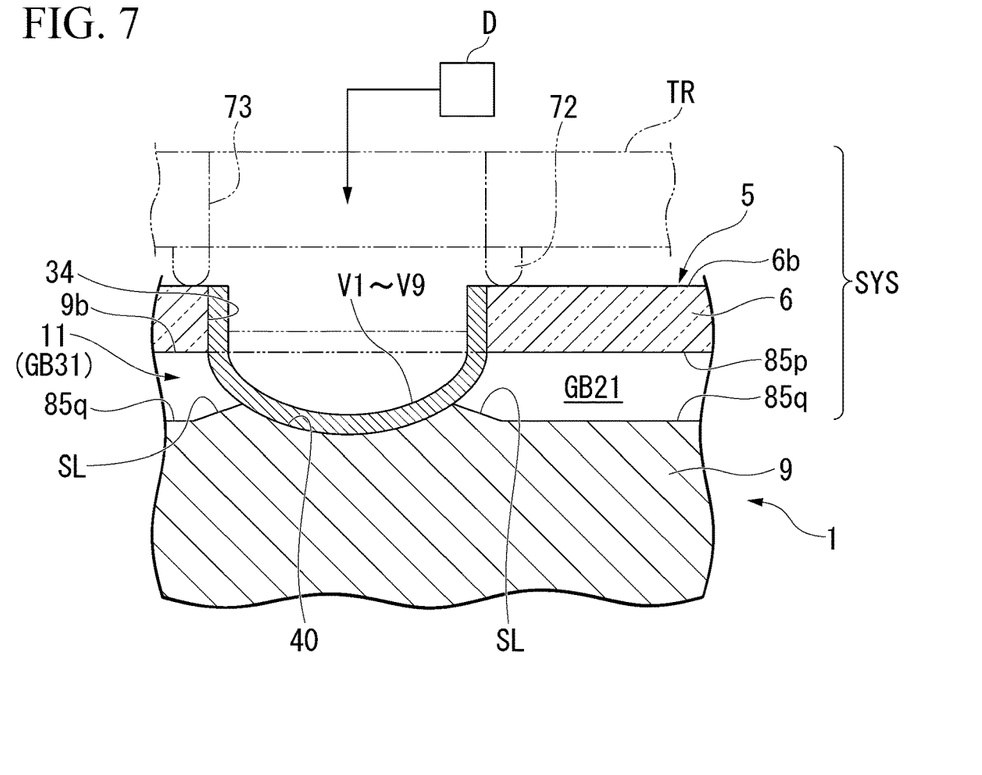
FIG. 7 is a cross-sectional view showing a basic configuration of a system SYS according to an embodiment.

FIG. 7 is a cross-sectional view showing a basic configuration of the system SYS.

As shown in FIG. 7, the system SYS includes the fluidic device 1 described above and a drive part TR. The fluidic device 1 is used by being set to the drive part TR. The drive part TR is formed in a plate shape and is arranged to face the upper surface 6b of the first base material when the fluidic device 1 is set. The drive part TR has a contact portion 72 that comes into contact with the upper surface 6b of the first base material 6 when the fluidic device 1 is set. The contact portion 72 is formed in an annular shape that surrounds the valve-holding hole 34. When the contact portion 72 is in contact with the upper surface 6b of the first base material 6, the contact portion 72 can seal a space between the contact portion 72 and the upper surface 6b in an airtight manner.

The drive part TR has a drive fluid supply hole (supply part) 73 that supplies a drive fluid to the valves V1 to V9 of the fluidic device 1. A drive fluid (for example, air) is supplied to the drive fluid supply hole 73 from a fluid supply source D. The drive fluid is a force that deforms the valves V1 to V9.

Figure 8:
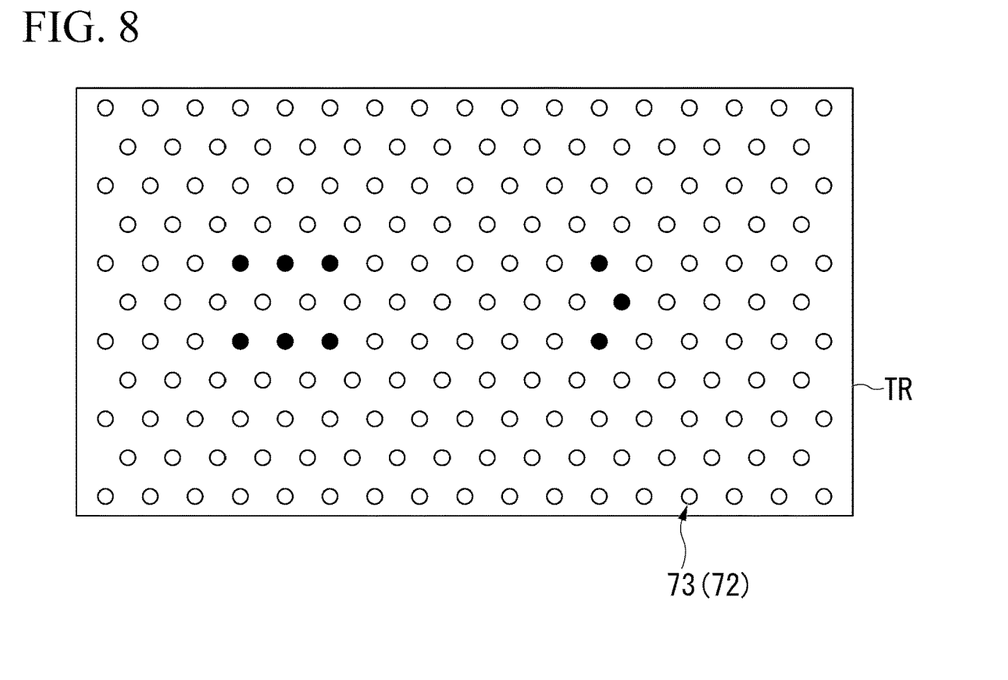
FIG. 8 is a plan view showing a drive part TR of the system SYS according to the embodiment.

FIG. 8 is a plan view of the drive part TR. As shown in FIG. 8, the drive part TR has a plurality of contact portions 72 and drive fluid supply holes 73. The drive fluid can be independently supplied to each drive fluid supply hole 73 from the fluid supply source D. A predetermined number (182 in FIG. 8) of the contact portions 72 and the drive fluid supply holes 73 are arranged in a two-dimensional hexagonal lattice pattern. The center positions of the valves V1 to V9 in the fluidic device 1 described above are arranged at positions (positions shown in black in FIG. 8) selected from the contact portions 72 and the drive fluid supply holes 73 arranged in the two-dimensional hexagonal lattice pattern.

In the system SYS having the configuration described above, by setting the fluidic device 1 to the drive part TR and supplying the drive fluid from the fluid supply source D in response to the opening and closing of the valves V1 to V9 described above, it is possible to introduce the solutions SA, SB, SC to the quantification parts GB1, GB2, GB3, respectively, and mix the solutions SA, SB, SC in the circulation flow path 10.

In the system SYS of the present embodiment, by arranging the valves V1 to V9 of the fluidic device 1 at positions selected from the contact portions 72 and the drive fluid supply holes 73 arranged in the two-dimensional hexagonal lattice pattern, it becomes possible to easily provide the merging/branching portion that is surrounded by a contour parallel to a line segment which connects apex positions of an equilateral triangle as described above. Therefore, in the system SYS of the present embodiment, in accordance with the measurement (inspection) target, without being limited to the arrangement and number of the flow paths 11 and the merging/branching portions GB11, GB12, GB21, GB22, GB31, GB32 in the fluidic device 1 described above, it becomes possible to design an optimal flow path capable of preventing air bubbles from being generated when the solution is introduced.

Although the preferred embodiments according to the present invention have been described above with reference to the accompanying drawings, the present invention is not limited to such examples. The various shapes, combinations, and the like of each constituent member shown in the examples described above are examples and can be variously changed on the basis of design requirements and the like without departing from the gist of the present invention.

For example, the arrangement and number of the flow paths, the merging/branching portions, and the valves shown in the above-described embodiment are examples, and as described above, by arranging the valve (and the merging/branching portion, the flow path) of the fluidic device 1 at a position selected from the contact portions 72 and the drive fluid supply holes 73 arranged in the two-dimensional hexagonal lattice pattern, it is possible to easily correspond to various measurement (inspection) targets.

Further, the above embodiment is described using a configuration in which the contour of the merging/branching portions GB11, GB12, GB21, GB22, GB31, GB32 is parallel to a line segment which connects apex positions of an equilateral triangle where the center positions of the valves V1 to V9 are arranged; however, the embodiment is not limited to such a configuration. For example, the contour may be the line segment which connects apex positions.

Further, the above embodiment is described using a configuration in which the centers of the valves V, V1 to V8 are arranged at the apex positions of the equilateral triangle forming the pair of merging/branching portions GB, GB1 to GB3; however, the embodiment is not limited to such a configuration as long as the valve is provided in a region that includes the apex position of the equilateral triangle. For example, the centers of the valves V, V1 to V8 may be arranged to be deviated from the apex position of the equilateral triangle forming the pair of merging/branching portions GB, GB1 to GB3.

Further, the above embodiment is described using an example in which the quantification part GB1 has a configuration of the pair of merging/branching portions GB11, GB12 having the same apex position; however, the embodiment is not limited to such a configuration. For example, like the quantification parts GB2, GB3 that have the pair of merging/branching portions GB21, GB22 or the pair of merging/branching portions GB31, GB32, a configuration in which the apex position is not shared may be employed.

Further, the above embodiment is described using a configuration in which the center positions of the valves V1 to V9 in the fluidic device 1 are arranged at positions selected from index points arranged in a two-dimensional hexagonal lattice pattern; however, the embodiment is not limited to such a configuration. The center position of the valve may be arranged at a position deviated from the two-dimensional hexagonal lattice pattern.

DESCRIPTION OF THE REFERENCE SYMBOLS

1 Fluidic device
5 Base material
6 First base material (another substrate)
9 Second base material (one substrate)
10 Circulation flow path (second transfer flow path)
11 Flow path
12A, 12B, 12C Introduction flow path (first transfer flow path)
13A, 13B, 13C Discharge flow path (first transfer flow path)
40 Recess
GB1, GB2, GB3 Quantification part
GB11, GB12, GB21, GB22, GB31, GB32 Merging/branching portion
GB13, GB23, GB33 Connection portion
S, SA, SB, SC Solution
V1 to V9 Valve

The invention claimed is:

1. A fluidic device, comprising
a pair of substrates which are stacked in a thickness direction, wherein one substrate of the pair of substrates includes a flow path constituted by being covered by the other substrate of the pair of substrates,
wherein the flow path includes a quantification part that is able to quantify a solution to a predetermined amount, the quantification part including:
a pair of merging/branching portions each of which is surrounded by a contour that matches each of line segments connecting apex positions of an equilateral triangle in a view of the thickness direction or a contour parallel to each of the line segments and at which merging or branching of the solution is performed; and
a connection portion that connects the pair of merging/branching portions via one of the apex positions of the equilateral triangle of each merging/branching portion, and
a valve which regulates a fluid flow in the flow path is provided at one of the apex positions in the merging/branching portion at which the connection portion is not arranged.

2. The fluidic device according to claim 1, wherein in the pair of merging/branching portions, one of the apex positions of the equilateral triangle of one merging/branching portion and one of the apex positions of the equilateral triangle of another merging/branching portion are arranged at an identical position.

3. The fluidic device according to claim 1, further comprising
a recess which is provided on one substrate of the pair of substrates and with which the valve comes into contact when the valve is deformed,
wherein the recess is inclined to a junction surface side of the pair of substrates from a bottom surface of the merging/branching portion toward the recess.

4. The fluidic device according to claim 3, wherein a width in the junction surface of the connection becomes narrower toward the recess.

5. The fluidic device according to claim 1, wherein a first transfer flow path of the solution is connectable to one of the apex positions at which the valve is provided in one merging/branching portion of the pair of merging/branching portions, and a second transfer flow path of the solution is connectable to one of the apex positions at which another valve is provided in another merging/branching portion.

6. The fluidic device according to claim 5, wherein the flow path includes a circulation flow path, and the pair of merging/branching portions are part of the circulation flow path.

7. The fluidic device according to claim 1, wherein the flow path includes a circulation flow path, wherein the circulation flow path is constituted of a plurality of the quantification parts, and one of the apex positions at which the connection portion is not arranged in the pair of merging/branching portions of each of the quantification parts is connected to one of the apex positions at which the connection portion is not arranged in the pair of merging/branching portions of another of the quantification parts.

8. The fluidic device according to claim 7, wherein the connection portion of at least one of the quantification parts comprises a pump section.

9. The fluidic device according to claim 1, wherein the fluidic device comprises a plurality of quantification parts and a plurality of the connection portions, such that each quantification part has a pair of the merging/branching portions and one of the connection portions, and
each of the merging/branching portions has an identical volume, and
each of the connection portions has a different volume, and thereby, an amount of a solution that is quantified in a quantification part differs.

10. The fluidic device according to claim 1, wherein distances between each line segment that connects the apex positions of the equilateral triangle and a plurality of the contours of the merging/branching portion are all identical on three sides.

11. The fluidic device according to claim 1, wherein with respect to a distance between each line segment that connects the apex positions of the equilateral triangle and the contour of the merging/branching portion, the distance on at least one side among three sides is different from the distance on another side.

12. The fluidic device according to claim 11, wherein in at least one merging/branching portion of the pair of merging/branching portions,
among the apex positions, a circulation flow path is connected to a first apex position via a first valve, and a non-circulation flow path is connected to a second apex position via a second valve.

13. The fluidic device according to claim 1, wherein a center position of the valve is arranged at a position selected from a predetermined number of index points arranged in a two-dimensional hexagonal lattice pattern.

14. A system, comprising:
a fluidic device according to claim 1; and
a supply part which is able to independently supply a force that deforms the valve when set to the fluidic device.

15. The system according to claim 14,
wherein the system comprises a plurality of supply parts,
wherein a predetermined number of the supply parts are arranged in a two-dimensional hexagonal lattice pattern, and
the valve is arranged at a position selected from the predetermined number of the supply parts arranged in the two-dimensional hexagonal lattice pattern.

* * * * *